(12) United States Patent
Greul et al.

(10) Patent No.: US 9,988,085 B2
(45) Date of Patent: Jun. 5, 2018

(54) METHOD FOR ASSISTING A DRIVER IN MANEUVERING A MOTOR-VEHICLE COMBINATION

(71) Applicant: Robert Bosch Automotive Steering GmbH, Schwäbisch Gmünd (DE)

(72) Inventors: Roland Greul, Schwäbisch Gmünd (DE); Nicolas Boos, Mutlangen (DE)

(73) Assignee: Robert Bosch Automotive Steering GmbH, Schwabish Gmund (DE)

( * ) Notice: Subject to any disclaimer, the term of this patent is extended or adjusted under 35 U.S.C. 154(b) by 0 days. days.

(21) Appl. No.: 15/319,536

(22) PCT Filed: Apr. 8, 2015

(86) PCT No.: PCT/EP2015/057540
§ 371 (c)(1),
(2) Date: Dec. 16, 2016

(87) PCT Pub. No.: WO2015/192986
PCT Pub. Date: Dec. 23, 2015

(65) Prior Publication Data
US 2017/0320520 A1 Nov. 9, 2017

(30) Foreign Application Priority Data

Jun. 17, 2014 (DE) ........................ 10 2014 108 484

(51) Int. Cl.
*B62D 13/06* (2006.01)
*B62D 13/00* (2006.01)
*B62D 15/02* (2006.01)

(52) U.S. Cl.
CPC ............. *B62D 13/06* (2013.01); *B62D 13/00* (2013.01); *B62D 15/027* (2013.01);
(Continued)

(58) Field of Classification Search
CPC .. B62D 15/024; B62D 15/025; B62D 15/029; B62D 15/0295; B62D 13/005; B62D 13/06; B62D 13/00; B60T 2230/08
(Continued)

(56) References Cited

U.S. PATENT DOCUMENTS 8,825,328 B2 * 9/2014 Rupp ..................... B62D 13/06
303/123
9,129,528 B2 * 9/2015 Lavoie ................. G08G 1/0962
(Continued)

FOREIGN PATENT DOCUMENTS

DE 102008043675 5/2010
DE 102008043675 A1 * 5/2010
(Continued)

OTHER PUBLICATIONS

Narrow passage assistant system for rear wheel steering semi-trailer truck; Junggun Yang; Sunghwan Yun; Kunsoo Huh 2017 2nd IEEE International Conference on Intelligent Transportation Engineering (ICITE); Year: 2017; pp. 9-13.*
(Continued)

*Primary Examiner* — Cuong H Nguyen
(74) *Attorney, Agent, or Firm* — Michael Best & Friedrich LLP

(57) ABSTRACT

The invention relates to a method for assisting a driver in maneuvering a motor-vehicle combination (1) comprising, as vehicles, at least one tractor motor vehicle (2) and at least two trailers (3a, 3b) coupled thereto, wherein a target articulation angle ($\gamma_2$) at least between two of the vehicles (3a, 3b) is externally specified and is adjusted by means of at least one steering actuator (5a, 5b) of at least one of the vehicles (2). The method comprises at least the following steps: a) dividing the motor-vehicle combination (1) into at least two sub-combinations (1a, 1b) in such a way that
(Continued)

adjacent vehicles (2, 3a, 3b) form a sub-combination (1a, 1b) in pairs, in which sub-combination a first vehicle is used as a trailer unit (3a, 3b) and a second vehicle is used as a tractor vehicle unit (2, 3a), at least virtually; b) repeatedly determining a target angle ($\alpha$, $\gamma_1$, $\gamma_2$) for a number of consecutive sub-combinations (1a, 1b) from a specified target articulation angle ($\gamma_1$, $\gamma_2$) between the tractor vehicle unit (2, 3a) and the trailer unit (3a, 3b), beginning with the sub-combination (1a) whose target articulation angle ($\gamma_2$) was specified externally, wherein: —the determined target angle is adjusted as a target steering angle ($\alpha$) for the tractor vehicle unit (2) of the sub-combination (1b) by means of the at least one steering actuator (5a, 5b) of the associated vehicle (2) if the tractor vehicle unit (2) has the at least one steering actuator (5a, 5b), or —the determined target angle is specified as the target articulation angle ($\gamma_1$) for the next sub-combination (1b).

11 Claims, 1 Drawing Sheet

(52) U.S. Cl.
CPC ......... *B60T 2230/08* (2013.01); *B62D 13/005* (2013.01); *B62D 15/024* (2013.01); *B62D 15/025* (2013.01); *B62D 15/029* (2013.01); *B62D 15/0295* (2013.01)

(58) Field of Classification Search
USPC ...................................... 701/41, 42; 340/431
See application file for complete search history.

(56) References Cited

U.S. PATENT DOCUMENTS

| | | | |
|---|---|---|---|
| 9,164,955 B2* | 10/2015 | Lavoie | G06F 17/00 |
| 2001/0052524 A1* | 12/2001 | Ichimaru | B60N 2/4686 |
| | | | 220/815 |
| 2008/0180526 A1* | 7/2008 | Trevino | B60D 1/36 |
| | | | 348/148 |
| 2011/0018231 A1* | 1/2011 | Collenberg | B60D 1/06 |
| | | | 280/448 |
| 2011/0160956 A1 | 6/2011 | Chung et al. | |
| 2011/0216199 A1* | 9/2011 | Trevino | B60D 1/36 |
| | | | 348/148 |
| 2014/0005918 A1* | 1/2014 | Qiang | B60D 1/245 |
| | | | 701/300 |
| 2014/0218522 A1* | 8/2014 | Lavoie | G08G 1/0962 |
| | | | 348/148 |
| 2014/0222288 A1* | 8/2014 | Lavoie | G06F 17/00 |
| | | | 701/41 |
| 2015/0069736 A1* | 3/2015 | Trevino | B60D 1/36 |
| | | | 280/477 |
| 2016/0041258 A1* | 2/2016 | Cashler | G01S 7/411 |
| | | | 342/70 |
| 2017/0015369 A1* | 1/2017 | Senatro | B62D 35/001 |

FOREIGN PATENT DOCUMENTS

| | | |
|---|---|---|
| EP | 1810913 | 7/2007 |
| EP | 1 847 442 A2 * | 10/2007 |
| EP | 1847442 | 10/2007 |

OTHER PUBLICATIONS

A Visual Template-Matching Method for Articulation Angle Measurement; Christopher de Saxe; David Cebon 2015 IEEE 18th International Conference on Intelligent Transportation Systems; Year: 2015; pp. 625-631.*
Video-based trailer detection and articulation estimation; Lukas Caup; Jan Salmen; Ibro Muharemovic; Sebastian Houben; 2013 IEEE Intelligent Vehicles Symposium (IV); Year: 2013; pp. 1179-1184.*
Estimation of Articulation Angle for Tractor Semi-trailer Based on State Observer;Liang Chu; Yong Fang; Mingli Shang; Jianhua Guo; Feikun Zhou; 2010 International Conference on Measuring Technology and Mechatronics Automation; Year: 2010, vol. 2; pp. 158-163.*
International Search Report for Application No. PCT/EP2015/057540 dated Oct. 8, 2015 (English Translation, 2 pages).

* cited by examiner

METHOD FOR ASSISTING A DRIVER IN MANEUVERING A MOTOR-VEHICLE COMBINATION

BACKGROUND OF THE INVENTION

The invention concerns a method for assisting a driver when maneuvering a motor vehicle combination comprising as vehicles at least one towing vehicle and at least two trailers coupled thereto. The invention also concerns a control unit of a towing vehicle.

There are a number of methods for controlling the articulation angle between the trailer and the towing motor vehicle while reversing a motor vehicle combination with a trailer. As a rule, said methods determine a target wheel turning angle from a specified target articulation angle between the trailer and the towing motor vehicle by means of a suitable control algorithm in order to achieve the target articulation angle. Said target wheel turning angle is applied by a suitable steering system. There are both methods that steer the wheels of the towing vehicle and also methods that steer the steerable axles of the trailer.

EP 1 810 913 A 1 concerns assisting a driver of a vehicle combination with a trailer when reversing, whereby the driver specifies the target articulation angle between the towing vehicle or the towing motor vehicle and the trailer and the target articulation angle is then automatically applied by the steering system.

Previous methods for assisting the driver when maneuvering a motor vehicle combination only concentrate, however, on controlling the articulation angle for motor vehicle combinations with only one trailer.

In a departure therefrom, the object of the present invention is to specify a method of the aforementioned type with which the articulation angle of a motor vehicle combination with a plurality of trailers can be controlled.

SUMMARY OF THE INVENTION

This object is achieved according to the invention by a method for assisting a driver when maneuvering a motor vehicle combination comprising as vehicles at least one towing vehicle and at least two trailers that are coupled thereto, wherein a target articulation angle between at least two of the vehicles is specified externally and is applied by means of at least one steering actuator of at least one of the vehicles, comprising at least the following steps of the method:
a) subdividing the motor vehicle combination into at least two sub-combinations such that in pairs adjacent vehicles form a sub-combination in which, at least virtually, a first vehicle is used as a trailer unit and a second vehicle is used as a towing vehicle unit;
b) repeated determination of a target angle for a number of successive sub-combinations from a specified target articulation angle between the towing vehicle unit and the trailer unit, starting at the sub-combination of which the target articulation angle has been specified externally, wherein:
  the determined target angle is applied as the target steering angle for the towing vehicle unit of the sub-combination by means of the at least one steering actuator of the associated vehicle if the towing vehicle unit comprises the at least one steering actuator, or
  the determined target angle is specified as the target articulation angle for the next sub-combination, in particular if the towing vehicle unit of the sub-combination does not comprise the at least one steering actuator.

With the method according to the invention, the articulation angles of an overall vehicle combination with at least three sub-vehicle combinations can be controlled. The motor vehicle combination comprises as vehicles at least one towing motor vehicle and at least two trailers that are coupled thereto, in particular in series. The angle between a longitudinal axis of a towing vehicle and a longitudinal axis of a trailer or between the longitudinal axes of two trailers is referred to here as the articulation angle. The overall vehicle combination is equipped with at least one actuator for driving the vehicle combination and with at least one actuator for applying a yaw torque to a sub-vehicle combination. With the presented method, the overall vehicle combination is subdivided into sub-vehicle combinations or sub-combinations. Said sub-vehicle combinations consists of a trailer and a towing vehicle. In this case, looking from the rear—i.e. looking in the direction of motion—at least virtually the first vehicle of the combination can be a trailer and the second vehicle can be the towing vehicle. A virtual towing vehicle means a trailer here for example, which is used in the sub-combination as a towing vehicle or a towing vehicle unit. A target wheel angle for the towing vehicle of the sub-vehicle combination can be determined from the target articulation angle between the towing vehicle and the trailer of the sub-vehicle combination by means of a suitable control algorithm, as specified for example in EP 1 810 913 A1. If the towing vehicle of the sub-vehicle combination comprises no steered wheels, then the sub-vehicle combination of the overall vehicle combination lying in front of the sub-vehicle combination is used as the virtual steerable wheel of the towing vehicle of the sub-combination. The target articulation angle of the penultimate sub-vehicle combination results from the target articulation angle of the last sub-vehicle combination. This is repeated up to the leading sub-vehicle combination. Ultimately, the target wheel angle of the towing vehicle of the overall vehicle combination results from the target articulation angle of the leading sub-vehicle combination. In this case, the end vehicle of the overall vehicle combination that is remote from the towing motor vehicle can be considered to be the rearmost vehicle. The measures according to the invention enable the control of vehicle combinations with more than three sub-vehicles or with more than two trailers. The target articulation angle specified by an external source can also be an articulation angle of a central sub-vehicle combination. This can for example be advantageous when "driving around" obstacles located in the vicinity of the sub-vehicle combination. The method according to the invention is also used during the forward travel of a vehicle combination with a plurality of trailers. The method can also be used with vehicle combinations in which the actuator for applying the yaw torque does not act on the first or the leading sub-vehicle combination or in which the towing vehicle is disposed in the middle of the combination.

The process step b) of the method according to the invention can be ended if the target steering angle for the towing motor vehicle of the motor vehicle combination has been applied by means of the at least one steering actuator. The method can therefore be ended if the target wheel angle of the towing motor vehicle of the overall vehicle combination has been set in the leading sub-vehicle combination.

There can be a stand-alone sub-controller associated with each sub-combination that determines the target angle from the specified target articulation angle between the towing vehicle unit and the trailer unit of the sub-combination.

Therefore, there can be a stand-alone, in particular a single, controller associated with each sub-vehicle combination that calculates a target angle from the specified target articulation angle for the sub-vehicle combination. Said target angle can either be a target articulation angle for the next sub-vehicle combination ahead or a target steering angle for the towing vehicle of the sub-vehicle combination.

The target articulation angle between the towing vehicle unit and the trailer unit of the sub-combination can be specified externally or obtained from the sub-controller of the previous sub-combination.

The source of the target articulation angle of a sub-vehicle combination can either be an external source or the sub-controller of the next sub-vehicle combination towards the rear.

The sub-controllers of the sub-combinations in series can form an overall controller or a cascade controller for determining the target steering angle of the towing motor vehicle of the motor vehicle combination from the externally specified target articulation angle.

Accordingly, the sub-controllers of the sub-vehicle combinations in series can form an overall controller/cascade controller for calculating the target wheel turning angles of the towing vehicle of the overall vehicle combination from the externally specified target articulation angle for the overall vehicle combination.

The externally specified target articulation angle can be transmitted by or obtained from an input unit by a user or by an automatic driver assistance system, for example of the towing motor vehicle.

An external source for the target articulation angle, which is specified externally for the overall vehicle combination, can therefore for example be a person that specifies the target articulation angle as an intended driving direction by means of a suitable input instrument, for example a rotary knob, a touch-screen device, a remote controller, etc. Alternatively or additionally, an automatic driver assistance system can determine the target articulation angle for example from a calculated target trajectory.

The method according to the invention can apply the specified target articulation angle continuously while the motor vehicle combination is travelling.

The at least one steering actuator of the at least one vehicle for applying a yaw torque can comprise at least one steerable wheel for example, wherein other solutions can also be considered. Electronically controlled steering systems, in particular servo steering systems, can of course be used for adjusting the wheel turning angle.

With the method according to the invention, signals of articulation angle sensors of the individual vehicles, i.e. of the towing vehicle and/or the trailer, can be used.

Vehicles that are not disposed at the front or at the rear of the motor vehicle combination can be part of two different sub-combinations.

Parts of vehicle combinations of the overall vehicle combination that are not positioned at the front or at the rear of the overall vehicle combination can thereby be part of two sub-vehicle combinations (once as a trailer and once as a towing vehicle).

A control unit of a towing motor vehicle for a motor vehicle combination is claimed that is arranged for performing the method according to the invention.

BRIEF DESCRIPTION OF THE DRAWINGS

An exemplary embodiment of the invention is described in principle below using the drawings.

In the figures.

DETAILED DESCRIPTION

Figure 1:
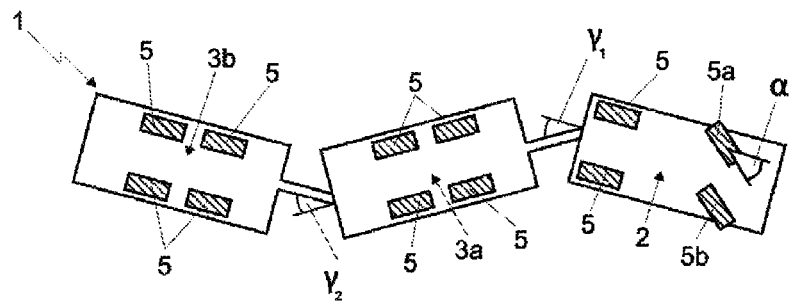
FIG. 1 shows a schematic representation of a motor vehicle combination comprising a towing vehicle and two trailers coupled thereto in series.

Functionally identical elements are provided with the same reference characters in the figures.

A motor vehicle combination 1 comprising as vehicles a towing motor vehicle 2 and two trailers 3a, 3b that are coupled thereto in series is shown in FIG. 1 for clarification of a method according to the invention. The wheels of the vehicles 2, 3a, 3b are provided with the reference character 5. The towing vehicle 2 comprises as a steering actuator a steering system that is not represented, which for example can be implemented as EPS (electric power steering) or AFS (active front steering), and wheels 5a, 5b that are steerable by the same. The steerable wheels 5a, 5b are considered here in a highly simplified way as a steering actuator. There is an articulation angle $\gamma_2$ between the trailer 3b and the trailer 3a. There is an articulation angle $\gamma_1$ between the trailer 3a and the towing motor vehicle 2. The wheel turning angle of the towing motor vehicle 2 is denoted by $\alpha$.

With the method according to the invention for assisting a driver when maneuvering the motor vehicle combination 1 comprising as vehicles the towing motor vehicle 2 and two trailers 3a, 3b that are coupled thereto, in particular in series, a target articulation angle $\gamma_2$ between two of the vehicles 3a, 3b is specified externally and is applied by means of a steering actuator 5a, 5b of the towing motor vehicle 2. The method comprises at least the following process steps:

a) subdividing the motor vehicle combination 1 into two sub-combinations 1a, 1b (see FIGS. 2 and 3) so that in pairs adjacent vehicles 2, 3a, 3b form the sub-combination 1a, 1b, in which at least virtually a first vehicle is used as a trailer unit 3a, 3b and a second vehicle is used as a towing vehicle unit 2, 3a;

b) repeated determination of a target angle $\alpha$, $\gamma_1$, $\gamma_2$ for a number of successive sub-combinations 1a, 1b from a specified target articulation angle $\gamma_1$, $\gamma_2$ between the towing vehicle unit 2, 3a and the trailer unit 3a, 3b, starting at the sub-combination 1a, the target articulation angle $\gamma_2$ of which has been specified externally, wherein the determined target angle is applied as the wheel turning angle or target steering angle $\alpha$ for the towing vehicle unit 2 of the sub-combination 1b by means of the at least one steering actuator 5a, 5b of the associated vehicle 2 if the towing vehicle unit 2 comprises the at least one steering actuator 5a, 5b, or the determined target angle is specified as the target articulation angle $\gamma_1$ for the next sub-combination 1b, in particular if the towing vehicle unit 3a of the sub-combination 1a does not comprise the at least one steering actuator.

Step b) of the method is ended if the target steering angle $\alpha$ for the towing motor vehicle 2 of the motor vehicle combination 1 has been applied by means of the steering actuator 5a, 5b.

Figure 2:
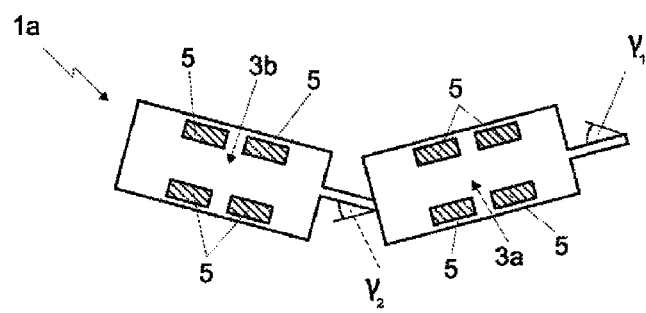
FIG. 2 shows a schematic representation of a first sub-combination of the motor vehicle combination.
Figure 3:
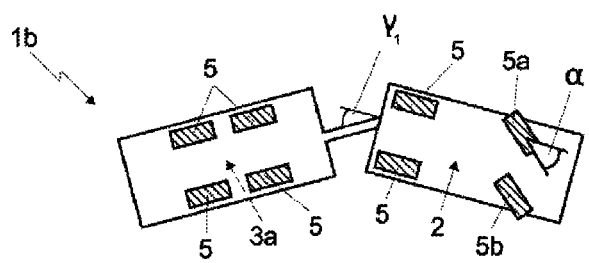
FIG. 3 shows a schematic representation of a second sub-combination of the motor vehicle combination.

As can be seen from FIG. 2, the articulation angle $\gamma_2$ is specified as the target articulation angle for the sub-combination 1a. In FIG. 2 the trailer 3b is used as the trailer unit and the trailer 3a is virtually used as the towing vehicle unit, wherein a start was made at the rearmost trailer 3b. Because the virtual towing vehicle unit 3a in FIG. 2 has no dedicated steering actuator, the determined target angle is specified as the target articulation angle $\gamma_1$ for the next sub-combination 1b (see FIG. 3). Said target articulation angle $\gamma_1$ can be considered to be the virtual wheel turning angle of the rest of the vehicle combination or the virtual towing vehicle unit 3a. Then, as can be seen from FIG. 3, the target angle for the sub-combination 1b is calculated from the specified target articulation angle $\gamma_1$. Here the trailer 3a is now used as the trailer unit and the towing motor vehicle 2 is used as the towing vehicle unit. Because the towing motor vehicle 2 or the towing vehicle unit comprises the steering actuator 5a, 5b, the target angle can be applied as the wheel turning angle or the target steering angle $\alpha$ by the steering actuator 5a, 5b.

There is a stand-alone sub-controller associated with each sub-combination 1a, 1b that determines the target angle $\alpha$, $\gamma_1$ from the specified target articulation angle $\gamma_1$, $\gamma_2$ between the towing vehicle unit 2, 3a and the trailer unit 3a, 3b of the sub-combination 1a, 1b.

The target articulation angle $\gamma_1$, $\gamma_2$ between the towing vehicle unit 2, 3a and the trailer unit 3a, 3b of the sub-combination 1a, 1b can be specified externally or obtained from the sub-controller of the previous sub-combination 1a, 1b.

The sub-controllers of the sub-combinations 1a, 1b in series can form an overall controller or cascade controller for determining the target steering angle $\alpha$ of the towing motor vehicle 2 of the motor vehicle combination 1 from the externally specified target articulation angle $\gamma_2$. The present externally specified target articulation angle $\gamma_2$ can be obtained from an input unit by a user or from an automatic driver assistance system. In a different exemplary embodiment, the target articulation angle $\gamma_1$ could also be specified externally.

With the method according to the invention, signals from articulation angle sensors, which are not shown, of the vehicles 2, 3a, 3b can be used.

The method according to the invention can be performed in a control unit, which is not shown, of the towing vehicle 2 for the motor vehicle combination 1.

REFERENCE CHARACTER LIST 1 motor vehicle combination
1a, 1b sub-combinations
2 towing motor vehicle
3a, 3b trailers
5 wheels
5a, 5b steerable wheels
$\gamma_1$, $\gamma_2$ articulation angles
$\alpha$ target steering angle

The invention claimed is:
1. A method for assisting a driver when maneuvering a motor vehicle combination (1) comprising as vehicles at least one towing vehicle (2) and at least two trailers (3a,3b) that are coupled thereto, wherein a target articulation angle ($\gamma_2$) between at least two of the vehicles (3a,3b) is specified externally and is applied by at least one steering actuator (5a,5b) of at least one of the vehicles (2), comprising at least the following process steps:

a) subdividing the motor vehicle combination (1) into at least two sub-combinations (1a, 1b) such that adjacent vehicles (2,3a,3b) in pairs form a sub-combination (1a, 1b), in which, at least virtually, a first vehicle is used as the trailer unit (3a,3b) and a second vehicle is used as the towing vehicle unit (2,3a);
b) repeated determination of a target angle (a, $\gamma_1$, $\gamma_2$) for a number of successive sub-combinations (1a, 1b) from a specified target articulation angle ($\gamma_1$, $\gamma_2$) between the towing vehicle unit (2,3a) and the trailer unit (3a,3b), starting at the sub-combination (1a) of which the target articulation angle ($\gamma_2$) has been externally specified, wherein:
the determined target angle is applied as the target steering angle ($\alpha$) for the towing vehicle unit (2) of the sub-combination (1b) by the at least one steering actuator (5a,5b) of the associated vehicle (2) if the towing vehicle unit (2) comprises the at least one steering actuator (5a,5b), or
the determined target angle is specified as the target articulation angle ($\gamma_1$) for the next sub-combination (1b).

2. The method as claimed in claim 1, wherein step b) is ended if the target steering angle ($\alpha$) for the towing vehicle (2) of the motor vehicle combination (1) has been applied by the at least one steering actuator (5a,5b).

3. The method as claimed in claim 1, wherein a stand-alone sub-controller is associated with each sub-combination (1a, 1b), and the stand-alone sub-controller determines the target angle ($\alpha$, $\gamma_1$) from the specified target articulation angle ($\gamma_1$, $\gamma_2$) between the towing vehicle unit (2,3a) and the trailer unit (3a,3b) of the sub-combination (1a,1b).

4. The method as claimed in claim 3, wherein the target articulation angle ($\gamma_1$, $\gamma_2$) between the towing vehicle unit (2,3a) and the trailer unit (3a,3b) of the sub-combination (1a, 1b) is specified externally or obtained from the sub-controller of the previous sub-combination (1a,1b).

5. The method as claimed in claim 3, wherein the sub-controllers of the sub-combinations (1a, 1b) in series form an overall controller or cascade controller for determining the target steering angle ($\alpha$) of the towing motor vehicle (2) of the motor vehicle combination (1) from the externally specified target articulation angle ($\gamma_2$).

6. The method as claimed in claim 1, wherein the externally specified target articulation angle ($\gamma_2$) is obtained from an input unit by a user.

7. The method as claimed in claim 1, wherein the at least one steering actuator (5a,5b) of the at least one vehicle (2) applies a yaw torque and comprises at least one steerable wheel (5a,5b).

8. The method as claimed in claim 1, wherein signals from articulation angle sensors of the vehicles (2,3a,3b) are used.

9. The method as claimed in claim 1, wherein vehicles (3a) that are not disposed at the front or at the rear of the motor vehicle combination (1) are part of two different sub-combinations (1a, 1b).

10. A control unit of a towing vehicle (2) for a motor vehicle combination (1) that is arranged for carrying out a method as claimed in claim 1.

11. The method as claimed in claim 1, wherein the externally specified target articulation angle ($\gamma_2$) is obtained from an input unit by an automatic driver assistance system.

* * * * *